United States Patent [19]

Sato et al.

[11] 4,387,198

[45] * Jun. 7, 1983

[54] PROCESS FOR PRODUCING α-OLEFIN POLYMERS

[75] Inventors: Akihiro Sato, Chibaken; Masami Tachibana, Ichiharashi; Kazutsune Kikuta, Ichiharashi; Yoshiharu Higuchi, Ichiharashi; Masazumi Miyajima, Ichiharashi, all of Japan

[73] Assignee: Chisso Corporation, Osaka, Japan

[*] Notice: The portion of the term of this patent subsequent to Dec. 8, 1998, has been disclaimed.

[21] Appl. No.: 242,971

[22] Filed: Mar. 12, 1980

[30] Foreign Application Priority Data

Mar. 14, 1980 [JP]  Japan ................................. 55-32392

[51] Int. Cl.³ ..................... C08F 4/02; C08F 10/06
[52] U.S. Cl. ........................ 526/97; 525/268; 526/114; 526/115; 526/116; 526/119; 526/121; 526/122; 526/124; 526/125; 526/351; 252/429 B
[58] Field of Search ................. 526/97, 114, 115, 116, 526/119, 121, 124, 122, 125; 525/268

[56] References Cited

U.S. PATENT DOCUMENTS

| | | | |
|---|---|---|---|
| 3,718,636 | 2/1973 | Stevens et al. | 526/125 |
| 3,900,454 | 8/1975 | Sato et al. | 526/119 |
| 4,103,078 | 7/1978 | Sato et al. | 526/97 |
| 4,177,160 | 12/1979 | Cecchin et al. | 526/904 |
| 4,200,717 | 4/1980 | Abe et al. | 526/903 |
| 4,210,729 | 7/1980 | Hermans et al. | 526/904 |
| 4,263,168 | 4/1981 | Rochefort et al. | 526/124 |
| 4,287,328 | 9/1981 | Kikuta et al. | 526/97 |
| 4,304,891 | 12/1981 | Sato et al. | 526/124 |

FOREIGN PATENT DOCUMENTS 2739608  3/1978  Fed. Rep. of Germany ...... 526/125

*Primary Examiner*—Edward J. Smith
*Attorney, Agent, or Firm*—Fred Philpitt

[57] ABSTRACT

A process for producing α-olefin polymers characterized by employing an organomagnesium compound in the preparation of a preactivated catalyst therefor is provided. The resulting polymers have particularly a higher rigidity in addition to various superior properties. The process comprises reacting a trivalent metal halide with a divalent metal compound to obtain a solid product (I); reacting this product with an organomagnesium compound, an electron donor (ED) and an electron acceptor (EA), once to 10 times, and at that time, using $TiCl_4$ at least once as the (EA) to obtain a solid product (II); combining this product with an organoaluminum compound (OAl) and an (ED), and at that time, subjecting a combination of (II) and (OAl) or that of (II), (OAl) and (ED) to polymerization treatment with an α-olefin, and in the case of the former combination, further adding (ED), to obtain a preactivated catalyst; and polymerizing α-olefin(s) in the presence of this catalyst.

18 Claims, No Drawings

PROCESS FOR PRODUCING α-OLEFIN POLYMERS

BACKGROUND OF THE INVENTION

1. Field of the Invention

This invention relates to production of α-olefin polymers, and more particularly it relates to a process for producing highly crystalline α-olefin polymers having a good particle form, with a high yield, by the use of a preliminarily activated catalyst which is suitable for polymerization of α-olefins, particularly gas phase polymerization, and further, as a modification of gas phase polymerization, a combination of gas phase polymerization with slurry of bulk polymerization.

2. Description of the Prior Art

The inventors of the present application have developed processes for polymerizing α-olefins including ethylene, by the use of catalysts comprising a combination of an organoaluminum, etc. with a solid product (which will be hereinafter referred to as solid catalyst component) obtained by having a transition metal compound supported on a solid product (I) obtained by reacting a trivalent metal halide with a divalent metal compound, in the following various reaction manners.

For examples, the following processes have been proposed:

(1) a process wherein a transition metal compound is reacted with the above-mentioned solid product (I) in the presence of an aromatic compound (Japanese patent publication Nos. 13,609/1972 and 16,782/1974);

(2) a process wherein the above-mentioned solid product (I) is reacted with a polysiloxane or an electron donor, and thereafter with a transition metal compound (Japanese patent publication No. 13,827/1977; Japanese patent application laid-open No. 61,283/1979);

(3) a process wherein a polysiloxane or an electron donor and a transition metal compound are added at the same time or a complex of them is added to the above-mentioned solid product (I), to effect reaction (Japanese patent application ) laid-open Nos. 116,078/1979, 113,687/1979 and 124,091/1979);

(4) a process wherein either one or both of at least one kind of electron donors and at least one kind of electron acceptors are reacted with the above-mentioned solid product (I), in a plurality of divided portions (Japanese patent application No. 101,960/1978);

(5) a process wherein at least one kind of electron donors and at least one kind of electron acceptors are reacted with the above-mentioned solid product (I), and at that time, TiCl$_4$ is employed as the electron acceptor at least once, and further the resulting solid catalyst component, an organoaluminum compound and an electron donor are combined together (Japanese patent application No. 106,797/1978);

(6) a process wherein at least one kind of electron donors and at least one kind of electron acceptors are reacted with the above-mentioned solid product (I), and at that time, TiCl$_4$ is employed as the electron acceptor at least once, and then a combination of the resulting solid catalyst component with an organoaluminum compound, an α-olefin and an electron donor is subjected to a polymerization treatment to prepare a preliminarily activated catalyst for α-olefin polymerization (Japanese patent application No. 148,1978); and (7) a process wherein various additives such as titanium alkoxides, silicone oils, polyethylene glycol dialkyl ethers, other electron donors, etc. are added at the time of polymerization (Japanese patent publication Nos. 13,609/1972, 13,772/1972). The inventions of these processes (1) to (7) will be hereinafter referred to as prior inventions.

In case where these prior inventions are applied to slurry polymerization or bulk polymerization, various advantages are brought about such that polymer yield per unit weight of catalyst component is very high; crystallinity of polymers of α-olefins such as propylene is high; particle form of polymers is good; further in the case of the inventions of the processes (5) and (6), it is possible to control the molecular weight distribution into a narrower range; etc. However, the α-olefin polymers obtained according to the prior inventions of the present inventors had lower rigidities; hence they have been unsuitable for the application fields where higher rigidities have been required.

Thus, the present inventors have made studies for enhancing the rigidity of α-olefin polymers, and as a result have found a process for improving the rigidity by the use of a preliminarily activated catalyst (abbreviated hereinafter to "preactivated catalyst") obtained by combining an organoaluminum compound, an electron donor and an α-olefin with a solid catalyst component obtained by employing an organomagnesium compound as one of the substances to be reacted with the above-mentioned solid product.

SUMMARY OF THE INVENTION

The present invention resides in the following process:

A process for producing α-olefin polymers which comprises:

reacting a trivalent metal halide with a hydroxide, oxide or carbonate of divalent metals of a composite salt containing the foregoing compounds or a hydrate of divalent metal-containing compounds (these latter compounds being hereinafter referred to as divalent metal compounds) to obtain a solid product (I);

reacting this solid product (I) with at least one kind of organomagnesium compounds, at least one kind of electron donors and at least one kind of electron acceptors, once to ten times, respectively, and at that time, employing titanium tetrachloride at least once as said at least one kind of electron acceptors, to obtain a solid product (II);

combining this solid product (II) with an organoaluminum compound and an electron donor (these three substances to be combined together being hereinafter referred to as catalyst components);

at the time of this combination, subjecting a part or the whole of the above-mentioned catalyst components to a polymerization treatment with an α-olefin (preferably in a small amount), at least in the coexistence of the above-mentioned solid product (II) and organosluminum compound, and if said part is subjected to the polymerization treatment, adding to the resulting treated materials the remainder of the catalyst components, to obtain a preactivated catalyst; and polymerizing an α-olefin or olefins in the presence of the preactivated catalyst obtained above.

DETAILED DESCRIPTION OF THE PREFERRED EMBODIMENTS

The components constituting the catalyst employed in the process of the present invention are as follows:

(A-1) Trivalent metal halide
(A-2) Divalent metal compound (hydroxide, oxide or carbonate of divalent metals or composite salt containing the foregoing compounds or hydrate containing divalent metal(s)).
(OMg) Organomagnesium compound
(ED) Electron donor
(EA) Electron acceptor
(OAl) Organoaluminum compound
($\alpha$-O) $\alpha$-Olefin Preparation of the catalyst employed in the present invention will be described below.

The solid product (I) is obtained by reacting a trivalent metal halide with a divalent metal compound.

As for the trivalent metal compound (A-1), aluminum trichloride (anhydrous), aluminum tribromide (anhydrous), ferric chloride (anhydrous), etc. are employed.

As for the divalent metal compound (A-2), for example, hydroxides such as $Mg(OH)_2$, $Ca(OH)_2$, $Zn(OH)_2$, $MN(OH)_2$, oxides such as $MgO$, $CaO$, $ZnO$, $MnO$, composite oxides containing divalent metal(s) such as $MgAl_2O_4$, $Mg_2SiO_4$, $Mg_6MnO_8$, carbonates such as $MgCO_3$, $MnCO_3$, composite carbonates containing carbonates of divalent metals such as $MgCO_3 \cdot CaCO_3$, halogenated hydrates such as $SnCl_2 \cdot 2H_2O$, $MgCl_2 \cdot nH_2O$ (n=1~6), $NiCl_2 \cdot 6H_2O$, $MnCl_2 \cdot 4H_2O$, $KMgCl_3 \cdot 6H_2O$, hydrates of composite compounds consisting of a halide and a hydroxide of divalent metals such as $MgCl_2 \cdot nMg(OH)_2 \cdot mH_2O$ (n=1~3, m=1~6), hydrates of composite oxides such as $3MgO \cdot 2SiO_2 \cdot 2H_2O$, hydrates of composite compounds consisting of a carbonate and a hydroxide of divalent metals such as $3MgCO_3 \cdot Mg(OH)_2 \cdot 3H_2O$, hydrates of hydroxide carbonate containing divalent metals such as $Mg_6Al_2(OH)_{16}CO_3 \cdot 4H_2O$, etc. are mentioned. Among them, divalent metal compounds containing magnesium are particularly preferable.

As for the preparation of the solid product (I), (1) a method of reacting a trivalent metal halide (A-1) with a divalent metal compound (A-2), while milling them together in a mill such as ball mill, vibration mill, etc., (2) a method of milling and mixing (A-1) and (A-2) together and thereafter reacting them by heating, and the like methods are illustrated. As for the ratio of amounts of (A-1) and (A-2), 0.1 to 20 mols of the divalent metal compound (A-2) per one mol of the trivalent metal halide (A-1) are sufficient. In the case of reaction with milling, as for the milling reaction conditions, room temperature (20° C.) to 500° C., 5 to 100 hours in the case of ball mill and 10 minutes to 50 hours in the case of vibration mill, are sufficient. Further, in the case of milling followed by heating, they are milled together for 5 to 100 hours in the case of ball mill or 10 minutes to 50 hours in the case of vibration mill, and thereafter heated at room temperature (20° C.) to 500° C. for 10 minutes to 50 hours. The solid thus obtained is referred to as solid product (I).

The solid product (I) is then reacted with (OMg) at least one kind of organomagnesium compounds, (ED) at least one kind of electron donors and (EA) at least one kind of electron acceptors (this reaction will hereinafter be often referred to as "formation reaction of solid product (II)").

The organomagnesium compounds (OMg) employed in the present invention are compounds obtained by the reaction of a halogen-containing organic compound with metallic magnesium, and expressed by the general formula $(MgR_2)_a \cdot (R'MgX)_b$ (wherein R and R' represent an alkyl group of 1 to 20 C or a phenyl group substituted or unsubstituted by an alkyl group of 1 to 10 C; X represents Cl, Br or I; and a and b represent a number of 0 to 1 and has a relationship of a+b=1). In other words, Grignard reagents in a narrow sense, expressed by R'MgX, dialkylmagnesiums expressed by $MgR_2$ or mixtures thereof are employed. Concrete examples are as follows: halogen-containing magnesium compounds such as $CH_3MgCl$, $CH_3MgBr$, $CH_3MgI$, $C_2H_5MgCl$, $C_2H_5MgBr$, $C_2H_5MgI$, $C_3H_7MgCl$, $C_3H_7MgBr$, $C_3H_7MgI$, $C_4H_9MgCl$, $C_4H_9MgBr$, $C_4H_9MgI$, $C_5H_{11}MgCl$, $C_5H_{11}MgBr$, $C_5H_{11}MgI$, $C_6H_{13}MgCl$, $C_6H_{13}MgBr$, $C_6H_{13}MgI$, $C_7H_{15}MgCl$, $C_7H_{15}MgBr$, $C_7H_{15}MgI$, $C_8H_{17}MgCl$, $C_8H_{17}MgBr$, $C_8H_{17}MgI$, $C_9H_{19}MgCl$, $C_9H_{19}MgBr$, $C_9H_{19}MgI$, $C_{10}H_{21}MgCl$, $C_6H_5MgCl$, $C_6H_5MgBr$, $C_6H_5MgI$, $CH_3(C_6H_4)MgCl$, $CH_3(C_6H_4)MgBr$, $CH_3(C_6H_4)MgI$; dialkylmagnesium compounds such as $Mg(CH_3)_2$, $Mg(C_2H_5)_2$, $Mg(C_3H_7)_2$, $Mg(C_4H_9)_2$, $Mg(C_5H_{11})_2$, $Mg(C_6H_{13})_2$, $Mg(C_7H_{15})_2$, $Mg(C_8H_{17})_2$; and mixtures of the foregoing compounds. Among these organomagnesium compounds, Grignard reagents in a narrow sense (wherein b=1 and a=0; R'=1~10 C; and X=Cl or Br in the above-mentioned general formula) are preferable.

As for the electron donors (ED) employed in the present invention, organic compounds containing at least one atom of oxygen, nitrogen, sulfur and phosphorus, such as alcohols, ethers, esters, aldehydes, organic acids, ketones, nitriles, amines, amides, ureas thioureas, isocyanates, azo compounds, phosphines, phosphites, phosphinites, thioethers, thioalcohols, polysiloxanes, etc. are employed. Among these electron donors, esters are most preferably employed. As for concrete examples of electron donors, alcohols such as methanol, ethanol, propanol, butanol, pentanol, hexanol, octanol, phenol, cresol, xylenol, ethylphenol, naphthol; ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, $\beta$(N,N-dimethylamino) ethanol, pyridine, quinoline, $\alpha$-picoline, N,N,N',N'-tetramethyl-hexaethylenediamine, aniline, dimethylaniline; amides such as formamide, hexamethyl phosphoric acid triamide, N,N,N',N''-pentamethyl-N'-$\beta$-dimethylaminoethyl phosphoric acid triamide, octamethylpyrophosphoroamide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned.

The polysiloxanes are chain or cyclic siloxane polymers expressed by the general formula

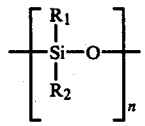

(wherein n represents 3–10,000), and $R_1$ and $R_2$ represent the same or different kinds of substituents capable of being combined to Si, and above all, those consisting of one kind of hydrogen, hydrocarbon residual group such as alkyl group, aryl group, etc., halogen, alkoxy group, aryloxy group, fatty acid residual group, etc., or those in which two kinds or more of the above-mentioned radicals or groups are distributed and combined in a molecule in various proportions may be employed.

Polysiloxanes commonly employed are those wherein each R in the above-mentioned formula is a hydrocarbon residual group, and as concrete examples, alkylsiloxane, polymers such as lower polymers e.g. octamethyltrisiloxane, octaethylcyclotetrasiloxane and polymers e.g. dimethylpolysiloxane, ethylpolycyclosiloxane, methylethylpolysiloxane etc., further arylsiloxane polymers such as hexaphenylcyclotrisiloxane, diphenylpolysiloxane, and further alkylarylsiloxane polymers such as diphenyloctamethyltetrasiloxane, methylphenylpolysiloxane, etc. are illustrated.

Besides, those wherein $R_1$ is hydrogen or halogen and $R_2$ is a hydrocarbon residual group such as alkyl group, aryl group, etc., e.g. alkylhydrogensiloxane polymers, haloalkylsiloxane polymers, haloarylsiloxane polymers, etc. are illustrated. Further, polysiloxanes wherein each R is alkoxy or aryloxy group or fatty acid residual group can be also employed.

The viscosity of polysiloxanes employed is suitably in the range of 10–10,000 centistokes, preferably 10–2,000 centistokes, at 25° C.

These electron donors (ED) may be also employed in admixture.

As for the electron acceptors (EA), halides of elements of III group to VIII group of the Periodic Table are mentioned. $AlCl_3$ (anhydrous), $SiCl_4$, $SnCl_2$, $SnCl_4$, $TiCl_4$, $ZrCl_4$, $PCl_3$, $PCl_5$, $VCl_4$, $SbCl_5$, $SCl_2$, $MnCl_2$, $FeCl_2$, $NiCl_2$, etc. are exemplified. They may be employed in admixture. Among the electron acceptors, $AlCl_3$ (anhydrous), $SiCl_4$, $SnCl_2$, $SnCl_4$ and $TiCl_4$ are preferably employed.

In the reaction of the organomagnesium compound (OMg), the electron donor (ED) and the electron acceptor (EA) with the solid product (I), a solvent may be employed. Further, in the case of washing or the like after the reaction, a solvent may be also employed. As such a solvent, aliphatic hydrocarbons such as n-pentane, n-hexane, n-heptane, n-octane, i-octane, n-nonane, n-decane, etc.; aromatic hydrocarbons such as benzene, toluene, xylene, ethylbenzene, cumene, etc.; and halogenated hydrocarbons such as carbon tetrachloride, chloroform, dichloroethane, trichloroethylene, tetrachloroethylene, carbon tetrabromide, chlorobenzene, orthodichlorobenzene, etc. (these will be hereinafter referred to merely as solvent) may be employed.

Next, the method for reacting (OMg), (ED) and (EA) with the solid product (I) will be described.

As for the reaction state, the reaction may be carried out in suspension state in the presence or absence of solvent (such reaction will be hereinafter referred to as suspension reaction), or may be carried out under milling with a milling means such as vibration mill, ball mill, etc. (such reaction will be hereinafter referred to as milling reaction), or may be carried out in a combination of suspension reaction with milling reaction (the reaction referred to in the following description includes both of suspension reaction and milling reaction).

In the present invention, $TiCl_4$ is necessarily employed as (EA). (EA) or (EA)s other than $TiCl_4$ are employed when a plurality of (EA)s are employed. When a plurality of kinds of (EA)s are employed, they may be employed in admixture, and when the reaction employing (EA) is carried out twice or more, the plurality of kinds of (EA)s may be employed either in admixture or separately. Either in the case of only once or in the case of twice or more, $TiCl_4$ is employed necessarily once. In such case, it is preferable to employ $TiCl_4$ alone as the (EA), but a mixture of $TiCl_4$ with other electron acceptors in a mixing proportion of $TiCl_4$ of 20% by weight or more may be also employed. When $TiCl_4$ as (EA) is referred to in the following description of the reaction employing (EA), it includes also the above-mentioned mixture besides $TiCl_4$, alone.

Each step of the formation reaction of the solid product (II) may be carried out according to either of milling reaction or suspension reaction as mentioned above. Further, so long as the reaction of (EA) contains reaction of $TiCl_4$ at least once, the formation reaction of the solid product (II) may be carried out optional reaction times (but within ten times), in an optional combination of reactants employed in once reaction and in an optional order of reactants. The most preferable embodiment is conducted by carrying out the reaction of $TiCl_4$ at least once, preferably twice or three times and in suspension manner at the final step of the formation reaction of the solid product (II) (such reaction will be hereinafter referred to as latter step reaction), and subjecting other (OMg), (ED) and (EA) together with the solid product (I) in a coexistent state of the total reactants (excluding $TiCl_4$ of the final step), to milling reaction, in advance of the suspension reaction of $TiCl_4$ carried out as the final step (such reaction will be hereinafter referred to as former step reaction). As for the respective reactants employed in the former step reaction, a part or the whole thereof may be in advance converted into a reaction product of the solid product (I) with (EA) (including the case of $TiCl_4$), a reaction product of (OMg) with (ED) or a reaction product of (ED) with (EA) by way of milling reaction or suspension reaction, and such reaction products may be employed. In the latter step reaction, (ED) or (EA) excluding $TiCl_4$ may be made coexistent with $TiCl_4$.

As for another embodiment of the formation reaction of the solid product (II), for example, it is also possible to subject the total reactants including $TiCl_4$ to either milling reaction or suspension reaction.

Examples of the main manners wherein (OMg), (ED) and (EA) are reacted with the solid product (I) will be further concretely mentioned below. The most desirable examples are as follows:

(1) a manner wherein the solid product (I), (OMg), (ED) and (ED) are subjected to milling reaction in the former step and TiCl$_4$ as an (EA) is subjected to suspension reaction in the later step.

This manner has the following manners:

(1-1) a manner wherein a reaction product of (OMg) with (ED$_1$), a reaction product of (ED$_2$) with (EA$_1$) and the solid product (I) are subjected to milling reaction and thereafter TiCl$_4$ as (EA$_2$) is subjected to suspension reaction once or twice or more;

(1-2) a manner wherein the solid product (1), (OMg) and a reaction product of (ED) with (EA$_1$) are subjected to milling reaction and thereafter TiCl$_4$ as (EA$_2$) is subjected to suspension reaction once or twice or more; and (1-3) a manner wherein the solid product (I), (OMg), (ED) and (EA$_1$) are subjected to milling reaction while they are added in an optional order, and thereafter TiCl$_4$ as (EA$_2$) is subjected to suspension reaction once or twice or more.

(EA$_1$) employed for the milling reaction is preferably SiCl$_4$ or AlCl$_3$, and the reaction is preferably carried out employing ester(s) as (ED) at least once. Other desirable manners are as follows:

(2) A manner wherein a solid obtained by subjecting the solid product (I) with TiCl$_4$ (EA$_2$) to suspension reaction, either one of (OMg) or a reaction product of (OMg) with (ED$_1$) and a reaction product of (ED$_2$) with (EA$_1$) are subjected to milling reaction, and thereafter TiCl$_4$ (EA$_2$) is subjected to suspension reaction once or twice or more.

(3) Further, there are the following manners wherein all the reactions are carried out by milling:

(3-1) a manner wherein the solid product (I), (OMg), (ED) and TiCl$_4$ (EA) are subjected to milling reaction;

(3-2) a manner wherein the solid product (I), (OMg), (ED) and (EA$_1$) are subjected to milling reaction, and thereafter TiCl$_4$ (EA$_2$) is subjected to milling reaction; and (3-3) a manner wherein the solid product (I) and a reaction product of (OMg) with (ED) are subjected to milling reaction; further (EA$_1$) is added and milling reaction is carried out; and further TiCl$_4$ (EA$_2$) is added and milling reaction is carried out.

As for the reaction times of TiCl$_4$, twice is more effective than once, but more than five times does not enhance the effectiveness so much.

In the above description of the manners, (ED$_1$), (ED$_2$), etc. or (EA$_1$), (EA$_2$), etc. mean different kinds or the same kind of (ED) or (EA), respectively. The same (ED) or (EA) means not only a single compound, but a mixture of two or more single compounds. When (EA$_1$), (EA$_2$), etc. of two kinds or more are employed as (EA), at least one of them is TiCl$_4$. Further, as for the reaction times of (OMg), (ED) or (EA), either even when the same kind thereof is employed or even when different kinds thereof are employed, the total of the times is up to 10 times, preferably up to 5 times, and even if the reactions are carried out more than 10 times, the effectiveness is not enhanced so much.

The amounts of the respective substances ((OMg), (ED) and (EA)) to be reacted with the solid product (I), employed per once (the substances will hereinafter be often referred to as reaction substances), are usually all 5 to 50 g based on 100 g of the solid product (I).

However, in the case of suspension reaction, the amount of liquid reactant employed may be increased so as to give a slurry concentration of 5 to 20% by weight, and further a solvent may be employed in place of a part or the whole of the increment. In the reaction of TiCl$_4$ which is preferably carried out at least once in suspension manner at the final step, as mentioned above, its amount employed is particularly increased, that is, it is preferable to employ an amount of 100 to 5,000 g based on 100 g of the solid product (I) and a solvent may be employed at the same time.

As for the conditions for the respective reaction steps of the formation reaction of the solid product (II), the reaction temperature is in the range of 0° to 500° C., preferably 20° to 200° C., and the reaction time has suitable ranges depending on the reaction state, that is, a range of one minute to 10 hours in the case of suspension reaction, and a range of 5 minutes to 200 hours in the case of milling reaction with ball mill, while a range of 10 minutes to 50 hours in the case of milling reaction with vibration mill.

The solid product obtained as above is a solid product (II).

After completion of the formation reaction, the solid product (II) contained in the reaction liquid is taken out therefrom by distillation under reduced or normal pressure to remove unreacted (ED) and (EA), or by filtration or decantation, followed by washing with a solvent and drying; or it is subjected to decantation, repeated washings with solvent and addition of a solvent to prepare a suspension. Thereafter the solid or the suspension is employed for the subsequent reaction.

The solid product (II) is then combined with an organoaluminum compound (OAl) and an electron donor (ED) to form catalyst components, and in this case a part or the whole of the catalyst components is subjected to a polymerization treatment with an α-olefin, at least in the coexistence of the solid product (II) and (OAl), to form a preactivated catalyst, which is then employed as a catalyst for polymerizing α-olefins. The "polymerization treatment" referred to in the present invention means that a small amount of an α-olefin is contacted with the catalyst components under polymerizable conditions to polymerize the α-olefin. As a result of this polymerization treatment, the catalyst components form a state where it is coated with the polymer of the α-olefin.

When the polymerization treatment is carried out employing the respective total amounts of the respective catalyst components, the catalyst preparation finishes after the polymerization treatment, but when the total amounts are not employed, but the remainders are further added after the polymerization treatment, the catalyst preparation finishes after completion of this addition.

The organoaluminum compounds (OAl) used in this invention include trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride; alkylaluminum hydrides such as diethylaluminum hydride, alkylaluminum sesquihalides such as methylaluminum sesquichloride, ethylaluminum sesquichloride. In addition, alkoxyalkylaluminums such as monoethoxydiethylaluminum, diethoxymonoethylaluminum, etc. can also be used.

The electron donors (ED) to be combined with the solid product (II) are the same with those described in the preparation of the solid product (II).

As for α-olefins employed for the preactivation, straight chain monoolefins such as ethylene, propylene, butene-1, hexene-1, heptene-1, octene-1, decene-1, etc., branched chain monoolefins such as 4-methyl-pentene-1, 2-methyl-pentene-1,3-methyl-butene-1, etc. and styrene, etc. are mentioned. These α-olefins may be same as or different from those to be polymerized employing the preactivated catalyst.

The polymerization treatment may be carried out in any one of a hydrocarbon solvent such as propane, butane, n-pentane, n-hexane, n-heptane, n-octane, benzene, toluene, etc., a liquefied α-olefin such as liquefied propylene, liquefied butene-1, etc. and ethylene or propylene gas, and hydrogen may be made coexistent at the time of the treatment.

In the preactivation, there may be employed 0.1 to 500 g of organoaluminum compound (OAl), 0.05 to 20 g of electron donor (ED), 5,000 g or less, preferably 0.05 to 1,000 g of α-olefin (α-O), 0 to 1,000 ml of hydrogen and 0 to 80 l of solvent, each based on 1 g of the solid product (II). In the polymerization treatment, (α-O) is reacted at 0° to 100° C. for one minute to 20 hours in the presence of at least the solid product (II) and (OAl) to give 0.01 to 500 g of reacted α-olefin based on 1 g of the solid product (II). The polymerization treatment may be also carried out in the presence of 0 to 5,000 g of an α-olefin polymer. Particles of such an α-olefin polymer may be either the same as or different from those as the polymerization object. After the polymerization treatment, if there is a remainder of the catalyst components to be added, it is added and the preactivation finishes.

After completion of the preactivation, it is possible to remove the solvent employed therein and unreacted α-olefin by distilling off them under reduced pressure or the like means, followed by drying, to obtain a preactivated catalyst in the form of dry powder, or it is also possible after the procedure to obtain a suspension of the solid product (II) in a solvent in an amount not exceeding 80 l based on 1 g of the solid product (II).

In order to obtain the preactivated catalyst from the solid product (II), an organoaluminum (OAl) and an electron donor (ED), by subjecting a part or the whole of the catalyst components to polymerization treatment with an α-olefin, the following various manners are illustrated:

(1) a manner wherein (OAl), the solid product (II) and (ED) are mixed together and thereafter (α-O) is added for preactivation; (2) a manner wherein the solid product (II), (OAl) and (ED) are added in an optional order in the presence of (α-O); (3) a manner wherein the solid product (II) and (OAl) are mixed together and thereafter (α-O) is added, followed by further adding (ED); (4) a manner wherein the solid product (II), (OAl) and (ED$_1$) are mixed together in an optional order, and thereafter (α-O) is added, followed by further adding (ED$_2$); (5) (OAl) and the solid product (II) are mixed together and thereafter (α-O$_1$) is added, followed by adding (ED) and further adding (α-O$_2$); and (6) a manner wherein the solid product (II), (OAl) and (ED$_1$) are added in an optional order and thereafter (α-O$_1$) is added, followed by adding (ED$_2$) and further adding (α-O$_2$) ((ED$_1$) and (ED$_2$) and (α-O$_1$) and (α-O$_2$) may be the same or different, respectively). In any of these manners, when the solid product (II), (OAl) and (α-O) have been brought into a coexistent state, polymerizaton treatment is to be carried out.

When the components of the solid product (II), (ED), (OAl) and (α-O) are mixed or added, agitation is carried out if necessary. In the mixing or addition thereof, the temperature is preferably in the range of room temperature (20° C.) to 100° C., and the time required for the mixing or the addition has no particular limitation, but it may be carried out over several minutes to several hours in total; when the ultimate component has been added, the preparation of the preactivated catalyst finishes. Among the above-mentioned manners, the manners (3) to (5) afford particularly superior results.

The preactivated catalyst prepared as above is employed for producing α-olefin polymers.

It is possible to employ this catalyst either for slurry polymerization carried out in a hydrocarbon solvent such as n-hexane, n-heptane, etc. or for bulk polymerization carried out in a liquefied α-olefin such as liquefied propylene, liquefied butene, etc. However, due to the high activity of the catalyst, desirable results are obtained even in the case of gas phase polymerization where an α-olefin such as propylene is polymerized in gas phase. A superior effectiveness is also brought about in the case of a modification of gas phase polymerization where slurry polymerization or bulk polymerization is carried out followed by gas phase polymerization.

In the present invention, gas phase polymerization may be carried out in any manner of fluidization by means of fluidized bed, fluidization with stirring blades, and vertical type or horizontal type paddle stirring. Further, either continuous polymerization or batch polymerization may be employed.

The above-mentioned modification of gas phase polymerization where gas phase polymerization is carried out after slurry or bulk polymerization may be carried out either batchwise or continuously. For example, there are (1) a method of carrying out slurry or bulk polymerization, thereafter removing solvent or liquefied α-olefin and successively carrying out gas phase polymerization, and (2) a method of carrying out slurry or bulk polymerization and continuing α-olefin polymerization without removing solvent or α-olefin, during which the solvent or liquefied α-olefin becomes small in the amount and the liquid portion occluded in polymer particles disappears; and the slurry or bulk polymerization moves, without applying any particular operation, to gas phase polymerization where an α-olefin is fed in the form of gas. Polymerization in a plurality of steps, consisting of a combination of slurry or bulk polymerization with gas phase polymerization affords desirable results particularly in continuous polymerization. As for an embodiment thereof, slurry or bulk polymerization is carried out in the first step. The polymerization is continued until polymer particles containing 30% or less of solvent or liquefied α-olefin are obtained, or solvent or liquefied α-olefin is removed, and thereafter gas phase polymerization of α-olefin is carried out in the second step by fluidizing the polymer particles. In the second step gas phase polymerization, the catalyst of the first step is used as it is, but addition of a fresh catalyst in the second step does not hinder the effectiveness of the present invention. In this case, as for the proportion of the slurry or bulk polymerization to the gas phase one, it is preferable to carry out polymerization in a ratio by weight of the former to the latter of 1:0.1~100 (by weight).

As for the polymerization conditions, any of slurry polymerization, bulk polymerization and gas phase polymerization may be carried out at a polymerization temperature of room temperature (20° C.) to 200° C., at a polymerization pressure of the atmospheric pressure (0 kg/cm$^2$G) to 50 kg/cm$^2$G and usually for a polymerization time of 5 minutes to 10 hours. Further, in the polymerization, conventional means such as addition of a suitable amount of hydrogen may be employed.

As for α-olefins subjected to polymerization in the instant process, straight chain monoolefins such as ethylene, propylene, butene-1, hexene-1, etc., branched chain monoolefins such as 4-methyl-pentene-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The first effectiveness of the present invention is that the resulting α-olefin polymers have a higher rigidity and have come to be applied to fields where a high rigidity is required. For example, the bending moduli (according to JIS K-7203) in the case of the above-mentioned prior inventions have been in the range of $1.0 \times 10^4$ kg/cm$^2$ at the most, whereas those in the case of the present invention have amounted to a range of 1.1 to $1.3 \times 10^4$ kg/cm$^2$, resulting in injection moldings having a higher rigidity and a less distortion.

The second effectiveness thereof is that the percentage of amorphous polymer (amorphous polypropylene in the case of polypropylene) formed is reduced. For example, in the case of polypropylene, the amount of atactic polypropylene as a hexane-soluble (20° C.) is reduced down to 2 to 4%, even in the case of polymers obtained according to gas phase polymerization. Further, even in the case of slurry polymerization, the amount is reduced down to 2 to 3%. Due to this reduction in the amount to be removed as atactic polymer, the loss of the polymers is not only reduced, but the load of the step of post-treating the polymers removed is reduced.

The third effectiveness thereof is that α-olefin polymers having a higher stereoregularity are obtained. For example, in the case of polypropylene, the stereoregularity of polymer after removal of atactic polymer amounts to 0.90 to 0.925 in terms of absorbance ratio of absorptions at 955 cm$^{-1}$ and 974 cm$^{-1}$ as measured by infrared absorption method (J. P. Luongo, J. Appl. Polymer Sci. 3, 302,1960). This ratio will hereinafter be referred to as IR-τ.

In the present invention, beside the above-mentioned effectivenesses, the effectiveness of the prior invention (6) is retained to the same extent or exhibited more, such that the catalyst has a high stability; the polymer yield is high; the transition metal is effectively utilized; the molecular weight distribution can be adjusted so as to give a narrow one; the polymer has a good shape; etc.

The effectiveness will be mentioned below in more detail.

Namely, the fourth effectiveness of the present invention is that the catalyst has a high stability. For example, even when the preactivated catalyst is allowed to stand in a catalyst tank for about one week, before it is employed for polymerization, no bad influences such as notable reduction in polymerization activity, notable reduction in crystallinity, inferiority of power form, etc. are observed.

The fifth effectiveness thereof is that the catalyst has an exceedingly high activity to give a high yield of α-olefin polymers. Namely, the polymer yield per g of the solid product (II) amounts to 5,000 to 20,000 g in the case of slurry or bulk polymerization, while it amounts to 5,000 to 15,000 g (polymer) even in the case of gas phase polymerization where the monomer concentration is relatively low. Thus, even in the case of gas phase polymerization, not to mention the case of slurry or bulk polymerization, it is possible to reduce the amount of catalyst; hence even when killing of catalyst or purification of polymer after completion of polymerization, is abbreviated, polymer is not colored and also no bad influences such as degradation of physical properties of polymer, rusting of mold at the time of polymer molding, etc. are observed, and further it is possible to abbreviate purification process of polymer.

The sixth effectiveness thereof is that the transition metal is very effectively utilized. For example, in the case of propylene polymerization, the polymer yield amounts to $1 \times 10^4 \sim 2.0 \times 10^6$ g (polymer)/g of transition metal atom.

The seventh effectiveness thereof is that the molecular weight distribution can be adjusted so as to give a narrow one. For example, adjustment to between 3.5 and 7.0 in terms of $\overline{M}_w/\overline{M}_n$ is possible.

The eighth effectiveness is that the polymer particles obtained have a good form, and also have a bulk density (BD) of 0.35 to 0.45.

The nineth effectiveness is that even in the case of gas phase polymerization, a sufficiently high yield is obtained; it is not necessary to remove catalyst residue in the polymer; no cohesion of polymer particles is observed during the polymerization, to make smooth the discharge of polymer from the polymerization vessel and its transportation and enable a long time stabilized continuous operation, whereby specific features intrinsic of gas phase polymerization can be exhibited. Namely, the specific features of gas phase polymerization that recovery and reuse of solvent and monomer can be minimized to reduce the costs of recovery and reuse and hence reduce the production cost of polymer, can be fully exhibited. Further, since the yield of polymer at the gas phase polymerization part is increased, a modification of gas phase polymerization, i.e. a process of slurry or bulk polymerization followed by gas phase polymerization, can be effectively carried out. Accordingly, since gas phase polymerization is carried out in the latter step, it is possible to elevate the polymer concentration up to 70% or higher in the slurry or bulk polymerization of the former step, followed by gas phase polymerization; hence, in the gas phase polymerization of the latter step, it is possible to effectively vaporize unreacted monomer through polymerization reaction heat. Particularly in the case of bulk polymerization followed by gas phase polymerization, a notable effectiveness can be exhibited on the effective utilization of polymerization reaction heat.

The present invention will be further described by way of Examples.

EXAMPLE 1

(1) Preparation of solid product (II)

Aluminum trichloride (anhydrous) (133 g) was reacted with magnesium oxide (40 g) under milling by means of a vibration mill at 250° C. for 3 hours, followed by cooling and taking out of the mill to obtain a solid product (I).

This solid product (I) (100 g), n-butylmagnesium chloride (n-C$_4$H$_9$MgCl) (20 g) and a reaction product obtained by reacting 30 g of ethyl benzoate with 22 g of silicon tetrachloride at 20° C. for 30 minutes, were introduced into a ball mill having an inner diameter of 200 mm and a capacity of 4.7 l and containing 100 balls of 15 mm in diameter, and subjected to milling reaction at room temperature (20° C.) for 48 hours. The solid thus obtained (100 g) was suspended in 900 g of titanium tetrachloride and then reacted together at 80° C. for 2 hours, followed by removing 700 g of titanium tetrachloride containing soluble matters as they were, by filtration.

Thereto were further added 800 g of titanium tetrachloride, and they were suspended. After this suspension was maintained at 80° C. for 30 minutes, titanium tetrachloride containing soluble matters was removed by filtration, followed by repeating washings followed by filtrations 4 times, each with 1,000 ml of n-hexane, and drying to obtain a solid product (II). The Ti atom content in 1 g of this solid product (II) was 12 mg.

(2) Preparation of preactivated catalyst

A 30 l capacity stainless steel reaction tube equipped with slant blades was purged with nitrogen gas and then 16 l of n-hexane, 4.56 g of triethylaluminum and 0.288 g of the solid product (II) were added. Propylene was fed at room temperature (20° C.), under a partial pressure of 1 kg/cm$^2$G for 10 minutes (the amount of propylene polymerized was 0.9 g/g of solid product (II), followed by adding 1.07 g of methyl p-toluylate to prepare a preactivated catalyst, which was then allowed to stand for 6 hours.

(3) Polymerization of propylene

Hydrogen (2400 ml) was introduced into the reaction tube of the above item (2) containing the preactivated catalyst obtained above, and propylene polymerization was carried out under a partial pressure of propylene of 10 kg/cm$^2$G at 70° C. for 3 hours. After completion of the reaction, unreacted propylene was purged, and 80 g of methanol was introduced to carry out killing reaction at 70° C. for 10 minutes, followed by cooling down to 20° C. The resulting polymer was divided into a n-hexane-insoluble polymer (at 20° C.) (isotactic polypropylene) and a n-hexane-soluble polymer (at 20° C.) (atactic polypropylene) to give 3,485 g and 100 g, respectively. The polymer yield of the isotactic polypropylene per g of the solid product (II) was 12,100 g. Its isotactic index (proportion of the weight of atactic polymer to the total weight of the polymer formed) was 2.8, and its bulk density (BD) was 0.45.

(4) Measurement of physical properties

(4-1) Measurement of molecular weight distribution

Propylene polymer was dissolved in orthodichlorobenzene as solvent so as to give a concentration of 0.1 to 0.5%. The resulting solution was subjected to measurement of molecular weight distribution at 140° C. and at a flow rate of 1 ml/min., employing GPC 200 type manufactured by Waters Co. (This measurement applies to the succeeding ones.) The propylene polymer obtained in Example 1 had a $\overline{M}_w/\overline{M}_n$ of 4.1.

(4-2) Measurement of IR-τ and bending modulus

Polypropylene obtained in Example 1 and annealed at 135° C. for 120 minutes was subjected to measurement of IR-τ according to Luongo's method to give 0.92. Its bending modulus measured according to JIS K-7203 was $1.2 \times 10^4$ Kg/cm$^2$.

EXAMPLE 2

Example 1 was repeated except that after the preactivated catalyst was prepared, it was employed for propylene polymerization without allowing it to stand.

EXAMPLE 3 n-C$_4$H$_9$MgCl (45 g) was suspended in n-hexane (450 ml) and to the resulting suspension was dropwise added a hydrogenated methylpolysiloxane (Toshiba Silicone Oil TSF 484; trade name of product manufactured by Toshiba; viscosity, 16 centistokes) (23 g), followed by reaction at 70° C. for 2 hours. After completion of the reaction, the resulting material was filtered off, washed twice with 100 ml of n-hexane and dried to obtain a reaction product (40.5 g).

The succeeding preparation of solid product (II), preparation and still standing of preactivated catalyst and propylene polymerization were carried out as in Example 1 except that the above-mentioned reaction product (30 g) was employed in place of n-C$_4$H$_9$MgCl (20 g) in Example 1 (1).

EXAMPLE 4

Ethyl benzoate (15 g) was added to n-C$_4$H$_9$MgCl (11.7 g) and reaction was carried out at 30° C. for one hour, followed by three times washings with n-hexane (100 ml) and drying to obtain a reaction product.

The succeeding preparation of solid product (II), preparation and still standing of preactivated catalyst and propylene polymerization were carried out as in Example 1 except that the above-mentioned reaction product (11 g) was employed in place of n-C$_4$H$_9$MgCl (20 g).

COMPARATIVE EXAMPLE 1

Preparation and still standing of preactivated catalyst and propylene polymerization were carried out as in Example 1 except that n-butylmagnesium chloride (20 g) was not used in the preparation of solid product (II).

Data of Examples 1~4 and Comparative example 1 are shown in Table 1.

TABLE 1

| No. of Example and Comparative ex. | Ti content in solid product (II) (mg/g) | Polymer yield (g) per g of solid product (II) | Polymer yield (g) per g of Ti atom (× 10⁵) | IR-τ | Bending modulus ($\times 10^4$ kg/cm²) | Atactic index | $\overline{M_w}/\overline{M_n}$ | BD | MFR* |
|---|---|---|---|---|---|---|---|---|---|
| Ex. 1 | 16.0 | 12,100 | 7.6 | 0.92 | 1.25 | 2.8 | 4.1 | 0.45 | 4.1 |
| Ex. 2 | 16.0 | 12,200 | 7.7 | 0.92 | 1.26 | 2.8 | 4.1 | 0.46 | 4.0 |
| Ex. 3 | 12.0 | 13,000 | 10.8 | 0.93 | 1.29 | 2.0 | 4.7 | 0.45 | 3.8 |
| Ex. 4 | 19.0 | 11,800 | 6.2 | 0.92 | 1.28 | 2.5 | 4.8 | 0.44 | 3.2 |
| Comp. ex. 1 | 18.0 | 11,000 | 6.1 | 0.88 | 0.91 | 4.0 | 4.8 | 0.44 | 4.2 |

*Melt Flow Index (according to ASTM D-1238 (L))

EXAMPLE 5

Preparation of solid product (II), preparation and still standing of preactivated catalyst and propylene polymerization were carried out as in Example 1 except that AlCl₃ (anhydrous) (12 g) was employed in place of SiCl₄ in the preparation of solid product (II).

EXAMPLE 6

Preparation of solid product (II), preparation and still standing of preactivated catalyst and propylene polymerization were carried out as in Example 1 except that isopropyl benzoate (40 g) was employed in place of ethyl benzoate in the preparation of solid product (II).

EXAMPLE 7

Dimethylpolysiloxane (Toshiba Silicone Oil TSF-451-100, product manufactured by Toshiba; viscosity, 100 centistokes) (74 g) was dropwise added into 1 l of a tetrahydrofurane solution containing ethylmagnesium chloride ($C_2H_5MgCl$) (88 g), and reaction was carried out at 50° C. for 30 minutes, followed by removing tetrahydrofurane under reduced pressure to obtain a reaction product. This reaction product (25 g), the solid product (I) obtained in Example 1 (100 g) and ethyl benzoate (40 g) were subjected to milling reaction in a ball mill for 24 hours, followed by further adding SiCl₄ (20 g) and subjecting to milling reaction for 24 hours, and thereafter adding TiCl₄ (40 g) and subjecting to milling reaction for 4 hours to obtain a solid, which was then suspended in n-hexane (500 ml) at 60° C. The resulting suspension was washed at 60° C. and dried to obtain a solid product (II). Thereafter, preparation of solid product (II), preparation and still standing of preactivated catalyst and propylene polymerization were carried out as in Example 1, (2) and (3).

EXAMPLE 8

Solid product (I) obtained in Example 1 (150 g) was suspended in TiCl₄ (1,000 g) and reaction was carried out at 80° C. for 2 hours to obtain a solid (100 g). This solid, n-C₄H₉MgCl (20 g), i-propyl benzoate (42 g) and SiCl₄ (8 g) were subjected to milling reaction to obtain a solid product (II). Preparation and still standing of preactivated catalyst and propylene polymerization were carried out as in Example 1.

EXAMPLE 9

Preparation of solid product (II), preparation and still standing of preactivated catalyst and propylene polymerization were carried out as in Example 1 except that methyl p-toluylate (22 g) was employed in place of ethyl benzoate in the preparation of solid product (II).

EXAMPLE 10

Preparation of solid product (II), preparation and still standing of preactivated catalyst and propylene polymerization were carried out as in Example 1 except that ethyl p-anisate (50 g) was employed in place of ethyl benzoate in the preparation of solid product (II).

COMPARATIVE EXAMPLE 2

Preparation and still standing of preactivated catalyst and propylene polymerization were carried out as in Example 1 except that ethyl benzoate (30 g) was not employed in the preparation of solid product (II).

The data of Examples 5~10 and Comparative example 2 are shown in Table 2.

TABLE 2

| No. of Example and Comparative ex. | Ti content in solid product (II) (mg/g) | Polymer yield (g) per g of solid product (II) | Polymer yield (g) per g of Ti atom (× 10⁵) | IR-τ | Bending modulus ($\times 10^4$ kg/cm²) | Atactic index | $\overline{M_w}/\overline{M_n}$ | BD | MFR |
|---|---|---|---|---|---|---|---|---|---|
| Ex. 5 | 14.0 | 11,000 | 7.9 | 0.92 | 1.25 | 2.6 | 4.9 | 0.46 | 3.1 |
| Ex. 6 | 14.0 | 13,200 | 9.4 | 0.93 | 1.28 | 2.1 | 4.6 | 0.44 | 5.1 |
| Ex. 7 | 16.0 | 12,000 | 7.5 | 0.92 | 1.24 | 2.6 | 4.8 | 0.43 | 5.4 |
| Ex. 8 | 21.0 | 13,100 | 6.2 | 0.92 | 1.26 | 2.4 | 4.9 | 0.44 | 5.3 |
| Ex. 9 | 14.0 | 12,000 | 8.6 | 0.93 | 1.28 | 2.1 | 4.9 | 0.43 | 5.1 |
| Ex. 10 | 18.0 | 13,400 | 7.4 | 0.92 | 1.25 | 2.4 | 5.6 | 0.44 | 4.3 |
| Comp. ex. 2 | 12.0 | 120 | 0.1 | 0.76 |  | 38.0 | 18.0 | 0.20 | 4.5 |

EXAMPLE 11

Example 1 was repeated except that, in the preparation of solid product (I), magnesium hydroxide (60 g) was employed in place of magnesium oxide and milling reaction was carried out in a vibration mill at 180° C. for 5 hours.

EXAMPLE 12

Example 1 was repeated except that, in the preparation of solid product (I), hydrotalcite (Mg$_2$Al$_2$(OH)$_{16}$CO$_3$.4H$_2$O) (50 g) was employed in place of magnesium oxide and milling reaction was carried out in a ball mill at 90° C. for 60 hours.

EXAMPLE 13

Example 1 was repeated except that, in the preparation of solid product (I), magnesium carbonate (98 g) was employed in place of magnesium oxide and milling reaction was carried out in a ball mill at 180° C. for 48 hours.

EXAMPLE 14

AlCl$_3$ (anhydrous) (133 g) and aluminum-magnesium oxide (MgAl$_2$O$_4$) (140 g) were milled in a ball mill for 24 hours and reaction was carried out at 320° C. for 5 hours, followed by cooling down to room temperature (20° C.) and further milling in a ball mill for 10 hours to obtain a solid product (I). The succeeding procedure was carried out as in Example 1.

EXAMPLE 15

AlCl$_3$ (anhydrous) (133 g) and hydromagnesite (3 MgCO$_3$.Mg(OH)$_2$.3H$_2$O) (130 g) were milled in a vibration mill for one hour and then heated at 250° C. for one hour, followed by cooling down to room temperature (20° C.) and further milling in a vibration mill for 30 minutes to obtain a solid product (I). The succeeding procedure was carried out as in Example 1.

COMPARATIVE EXAMPLE 3 n-C$_4$H$_9$MgCl (48 g), ethyl benzoate (72 g) and SiCl$_4$ (53 g) were reacted together at 20° C. for 30 minutes without employing solid product (I) (100 g) to obtain a reaction product which was then subjected to milling reaction for 48 hours to obtain a solid. TiCl$_4$ was reacted with this solid (100 g) as in the reaction manner of TiCl$_4$ in Example 1 (1) to obtain a final solid product. Employing this solid product, preparation and still standing of preactivated catalyst and propylene polymerization were carried out as in Example 1, (2) and (3). In the absence of solid product (I), the activity of the resulting catalyst is low, the atactic (basis: Table 3) index of the resulting polymer is large and its molecular weight distribution cannot be narrowed; hence the solid product (I) is indispensable.

COMPARATIVE EXAMPLE 4

Preparation and still standing of preactivated catalyst and propylene polymerization were carried out as in Example 1 except that magnesium oxide (100 g) was employed in place of solid product (I) in the preparation of solid product (II).

COMPARATIVE EXAMPLE 5

Preparation and still standing of preactivated catalyst and propylene polymerization were carried out as in Example 1 except that AlCl$_3$ (anhydrous) (100 g) was employed in place of solid product (I) in the preparation of solid product (II).

The data of Examples 11~15 and Comparative examples 3~5 are shown in Table 3.

TABLE 3

| No. of Example and Comparative ex. | Ti content in solid product (II) (mg/g) | Polymer yield (g) per g of solid product (II) | Polymer yield (g) per g of Ti atom (× 10$^5$) | IR-$\tau$ | Bending modulus ($\times 10^4$ kg/cm$^2$) | Atactic index | $\overline{M_w}/\overline{M_n}$ | BD | MFR |
|---|---|---|---|---|---|---|---|---|---|
| Ex. 11 | 22.0 | 11,500 | 5.2 | 0.92 | 1.20 | 2.8 | 5.0 | 0.44 | 4.0 |
| Ex. 12 | 21.0 | 10,500 | 5.0 | 0.93 | 1.26 | 2.4 | 5.1 | 0.45 | 3.8 |
| Ex. 13 | 18.0 | 11,000 | 6.1 | 0.92 | 1.20 | 2.8 | 4.9 | 0.46 | 3.6 |
| Ex. 14 | 19.0 | 10,800 | 5.7 | 0.91 | 1.20 | 3.0 | 4.6 | 0.44 | 3.9 |
| Ex. 15 | 20.0 | 11,800 | 5.9 | 0.92 | 1.24 | 2.6 | 5.1 | 0.43 | 4.8 |
| Comp. ex. 3 | 60.0 | 3,200 | 0.5 | 0.87 | 0.90 | 7.0 | 9.2 | 0.34 | 4.2 |
| Comp. ex. 4 | 58.0 | 750 | 0.1 | 0.86 | 0.89 | 12.0 | 8.5 | 0.30 | 4.4 |
| Comp. ex. 5 | 42.0 | 1,200 | 0.3 | 0.86 | 0.89 | 9.0 | 8.4 | 0.32 | 4.3 |

EXAMPLE 16

(1) Preparation of preactivated catalyst n-Hexane (480 ml), triethylaluminum (4.96 g), ethyl p-anisate (0.256 g) and the solid product (II) obtained in Example 1 (0.336 g) were introduced into a reactor and further propylene (20 g) was added and reaction was carried out at 30° C. for 10 minutes to polymerize 2.3 g of propylene per g of solid product (II), followed by purging unreacted propylene and adding methyl p-toluylate (0.848 g) to obtain a preactivated catalyst, which was then allowed to stand for 20 hours.

(2) Polymerization of propylene

Hydrogen (4,800 ml) was introduced into the reactor containing the above catalyst, and gas phase polymerization reaction was carried out under a partial pressure of propylene of 25 Kg/cm$^2$G at 70° C., for 2.5 hours. After completion the reaction, methanol (100 g) was introduced and killing reaction was carried out at 70° C. for 20 minutes, followed by suspending the total amount of the polymer in n-hexane (16 l), allowing the resulting suspension to stand at 20° C. for 30 minutes, filtering off the polymer, dividing it into n-hexane-soluble polymer and n-hexane-insoluble polymer at 20° C. and drying the respective polymers.

EXAMPLE 17

Polypropylene (240 g) obtained in advance by slurry polymerization, n-pentane (800 ml), triethylaluminum (2.88 g), ethyl benzoate (0.192 g) and the solid product (II) (0.320 g) obtained in Example 2 were mixed together and reaction was then carried out under a propylene partial pressure of 4 Kg/cm$^2$G at 40° C. for 5 minutes to polymerize 5.0 g of propylene per g of solid product (II), followed by purging unreacted propylene. Ethyl p-anisate (0.640 g) was then added, further propylene (8 g) was added, and 0.5 g of propylene per g of solid product (II) was polymerized at 40° C., followed by still standing at room temperature (20° C.) for 48 hours. Propylene polymerization was then carried out as in Example 16 (2).

EXAMPLE 18

Polypropylene (80 g) obtained in advance by slurry polymerization, n-pentane (48 ml), triethylaluminum (2.08 g) and solid product (II) (0.288 g) obtained in Example 2 were mixed together and hydrogen (1,280 ml) was introduced, followed by reaction under a propylene partial pressure of 1 Kg/cm$^2$G at 20° C. for 10 minutes (reacted propylene per g of solid product (II): 0.67 g). Methyl p-toluylate (0.720 g) was then added and n-pentane, hydrogen and unreacted propylene were removed under reduced pressure to obtain a catalyst in the form of powder, which was then allowed to stand for 8 hours. Employing this catalyst, propylene polymerization was carried out as in Example 16 (2).

EXAMPLE 19

Polyethylene powder (80 g) obtained in advance by slurry polymerization, n-pentane (160 ml), triethylaluminum (1.92 g) and solid product (II) (0.320 g) obtained in Example 2 were introduced into a reactor, and n-pentane was then removed under reduced pressure. Thereafter, gas phase reaction was carried out under a propylene partial pressure of 2 Kg/cm$^2$G at 70° C. for 20 minutes while the material obtained above was fluidized by propylene (reacted propylene per g of solid product (II): 0.5 g), followed by cooling down to 20° C. and then adding i-propyl benzoate (0.960 g) to obtain a preactivated catalyst, which was then allowed to stand at 20° C. for 10 hours. Employing the resulting catalyst, propylene polymerization was carried out as in Example 16 (2).

COMPARATIVE EXAMPLE 6

Preparation and still standing of preactivated catalyst and propylene polymerization were carried out as in Example 1 except that methyl p-toluylate (1.07 g) was not added in the preparation of preactivated catalyst.

COMPARATIVE EXAMPLE 7

Preparation and still standing of preactivated catalyst and propylene polymerization were carried out as in Example 1 except that after solid product (II) obtained in Example 1 was employed and combined with triethylaluminum, methyl p-toluylate was added without feeding propylene.

The data of Examples 16~19 and Comparative examples 6 and 7 are shown in Table 4.

TABLE 4

| No. of Example and Comparative ex. | Ti content in solid product (II) (mg/g) | Polymer yield (g) per g of solid product (II) | Polymer yield (g) per g of Ti atom (× 10$^5$) | IR-$\tau$ | Bending modulus (× 10$^4$ kg/cm$^2$) | Atactic index | $\overline{M_w}/\overline{M_n}$ | BD | MFR |
|---|---|---|---|---|---|---|---|---|---|
| Ex. 16 | 16.0 | 11,400 | 7.1 | 0.92 | 1.28 | 2.2 | 4.9 | 0.46 | 4.0 |
| Ex. 17 | 12.0 | 12,400 | 10.3 | 0.92 | 1.25 | 2.5 | 5.3 | 0.45 | 4.5 |
| Ex. 18 | 12.0 | 12,800 | 10.7 | 0.93 | 1.28 | 2.1 | 5.6 | 0.45 | 4.1 |
| Ex. 19 | 12.0 | 11,400 | 9.5 | 0.92 | 1.21 | 2.6 | 5.4 | 0.44 | 4.8 |
| Comp. ex. 6 | 16.0 | 4,200 | 2.6 | 0.88 | 0.90 | 8.0 | 8.4 | 0.40 | 4.4 |
| Comp. ex. 7 | 16.0 | 4,300 | 2.7 | 0.88 | 0.91 | 3.0 | 5.2 | 0.41 | 4.3 |

EXAMPLE 20

A preactivated catalyst obtained as in Example 16 (1) was suspended in n-hexane (19 l) and hydrogen (4,800 ml) was added, followed by polymerization reaction under a propylene partial pressure of 12 Kg/cm$^2$G at 65° C. for 2.5 hours. After completion of the reaction, steam was blown in to remove n-hexane by steam distillation to give powder, which was then dried and post-treated as in Example 16 (2).

EXAMPLE 21

A preactivated catalyst obtained as in Example 16 (1) was introduced into liquified propylene (4,800 g) containing hydrogen (7,200 ml) and polymerization reaction was carried out under 32 Kg/cm$^2$G, at 70° C. for 30 minutes, followed by purging unreacted propylene to obtain a polymer.

EXAMPLE 22

Bulk polymerization reaction was carried out under 32 Kg/cm$^2$G, at 70° C. for 30 minutes as in Example 21. Thereafter gas phase polymerization reaction was carried out under a propylene partial pressure of 21 Kg/cm$^2$G (the partial pressure decreasing with the progress of polymerization being maintained by feeding fresh propylene), at a reaction temperature of 65° C., for 2 hours while the slurry containing unreacted propylene, obtained by the bulk polymerization was flushed into a fluidized bed reactor having a diameter of 40 cm and a capacity of 100 l and equipped with stirring elements and polymer was fluidized by circulated propylene at a flow rate of 5 cm/sec.

EXAMPLE 23

Polymer was obtained as in Example 16 (2) except that ethylene (80 g) and hydrogen (3,200 ml) were added and propylene-ethylene copolymerization was carried out.

EXAMPLE 24

Polymer was obtained as in Example 16 (2) except that butene-1 (48 g) and hydrogen (4,000 ml) were employed and propylene-butene-1 copolymerization was carried out.

EXAMPLE 25

Polymer was obtained as in Example 1 (3) except that ethylene polymerization was carried out under a hydrogen pressure of 10 Kg/cm$^2$G and an ethylene partial pressure of 15 Kg/cm$^2$G at 85° C., in place of propylene polymerization at 70° C. employing hydrogen (2,400 ml).

The data of Examples 20~25 are shown in Table 5.

TABLE 5

| No. of Example and Comparative ex. | Ti content in solid product (II) (mg/g) | Polymer yield (g) per g of solid product (II) | Polymer yield (g) per g of Ti atom (× 10$^5$) | IR-$\tau$ | Bending modulus ($\times 10^4$ kg/cm$^2$) | Atactic index | $\overline{M}_w/\overline{M}_n$ | BD | MFR |
|---|---|---|---|---|---|---|---|---|---|
| Ex. 20 | 16.0 | 9,200 | 5.8 | 0.92 | 1.20 | 2.1 | 5.7 | 0.45 | 4.1 |
| Ex. 21 | 16.0 | 5,000 | 3.1 | 0.92 | 1.23 | 2.4 | 5.8 | 0.44 | 4.3 |
| Ex. 22 | 16.0 | 13,000 | 8.1 | 0.92 | 1.25 | 2.6 | 5.9 | 0.43 | 3.8 |
| Ex. 23 | 16.0 | 12,900 | 8.1 | 0.91 | 1.18 | 3.4 | 5.0 | 0.44 | 3.2 |
| Ex. 24 | 16.0 | 12,400 | 7.8 | 0.91 | 1.20 | 3.0 | 5.2 | 0.44 | 3.8 |
| Ex. 25 | 16.0 | 11,000 | 6.9 | — | 1.25 | — | 5.0 | 0.42 | 4.5 |

What is claimed is:

1. A process for producing propylene polymers which comprises:
   (1) milling (A-1) a trivalent metal halide selected from the group consisting of aluminum trichloride (anhydrous), ferric chloride (anhydrous) and aluminum tribromide (anhydrous), together with
   (A-2) a divalent metal compound selected from the group consisting of
   Mg(OH)$_2$, Ca(OH)$_2$, Zn(OH)$_2$, Mn(OH)$_2$, MgO, CaO, ZnO, MnO, MgAl$_2$O$_4$, Mg$_2$SiO$_4$, Mg$_6$MnO$_8$, MgCO$_3$, MnCO$_3$, MgCO$_3$.CaCO$_3$, SnCl$_2$.2H$_2$O, MgCl$_2$.nH$_2$O (n=1~6), NiCl$_2$.6-H$_2$O, MnCl$_2$.4H$_2$O KMgCl$_3$.6H$_2$O, MgCl$_2$.nMg(OH)$_2$.mH$_2$O (n=1~3, m=1~6), 3MgO.2SiO$_2$.2H$_2$O, 3MgCO$_3$.Mg(OH)$_2$.3H$_2$O and Mg$_6$Al$_2$(OH)$_{14}$CO$_3$.4H$_2$O,
   in a proportion of 0.1 to 20 mols of (A-2) to one mol of (A-1), and
   (2) reacting the resulting mixture of (A-1) with (A-2) at a temperature of room temperature (20° C.) to 500° C.,
   to obtain a solid product (I);
   (3) reacting with this solid product (I),
   (OMg) an organomagnesium compound expressed by the general formula (MgR$_2$)$_a$.(R'MgX)$_b$ (wherein R and R' each represent an alkyl group of 1 to 20 carbon atoms or an alkyl-substituted or non-substituted phenyl group of 1 to 10 carbon atoms; X represents Cl, Br or I; and a and b each represent a number of 0 to 1, the total of a and b being 1),
   (ED) an electron donor selected from the group consisting of alcohols, ethers, esters, aldehydes, fatty acids, ketones, nitriles, amines, amides, ureas, thioureas, isocyanates, azo compounds, phosphines, phosphites, phosphinites, thioethers, thioalcohols and polysiloxanes, and
   (EA) an electron acceptor selected from the group consisting of AlCl$_3$ (anhydrous), SiCl$_4$, SnCl$_2$, SnCl$_4$, TiCl$_4$, ZrCl$_4$, PCl$_3$, PCl$_5$, VCl$_4$, SbCl$_5$, SCl$_2$, MnCl$_2$, FeCl$_2$ and NiCl$_2$,
   at a reaction temperature of 0° to 500° C., preferably 20° to 200° C.,
   (OMg), (ED) and (EA) being respectively reacted one to 10 times,
   TiCl$_4$ being employed as said electron acceptor at least once, and
   (OMg), (ED) and (EA) being respectively employed in an amount of 5 to 50 parts by weight each time, based on 100 parts by weight of said solid product (I),
   to obtain a solid product (II);
   (4) combining with one part by weight of this solid product (II),
   0.1 to 500 parts by weight of (OAl) an organoaluminum compound, and
   0.05 to 20 parts by weight of (ED) an electron donor, and
   at the time of this combination, subjecting (a) a combination of the solid product (II) with (OAl) or (b) a combination of the solid product (II), (OAl) and (ED) to polymerization treatment with 0.01 to 500 parts by weight based on one part of the solid product (II), of ($\alpha$-0) an $\alpha$-olefin, at a temperature of 0° to 100° C. for one minute to 20 hours, and when said combination (a) is subjected to polymerization treatment, further adding (ED),
   to obtain a preactivated catalyst; and
   (5) polymerization propylene or propylene and at least one $\alpha$-olefin in the presence of this catalyst.

2. A process according to claim 1 wherein R$_i$MgX (wherein R$_i$ represents an alkyl group of 1 to 10 carbon atoms and X represents Cl, Br or I), C$_6$H$_5$MgX (wherein X is same as defined above), CH$_3$(C$_6$H$_4$)MgX (wherein X is same as defined above) or Mg(R$_i$')$_2$ (wherein R$_i$' represents an alkyl group of 1 to 8 carbon atoms) is employed as said (OMg).

3. A process according to claim 1 wherein said reaction for obtaining the solid product (II) is carried out in suspension manner for one minute to 10 hours.

4. A process according to claim 1 wherein said reaction for obtaining the solid product (II) is carried out in milling manner with a ball mill for 5 to 200 hours.

5. A process according to claim 1 wherein said reaction for obtaining the solid product (II) is carried out in milling manner with a vibration mill for 10 minutes to 50 hours.

6. A process according to claim 1 wherein TiCl$_4$ alone is employed as said (EA).

7. A process according to claim 1 wherein TiCl$_4$ is employed only once as said (EA) when said (EA) is employed one to 10 times.

8. A process according to claim 7 wherein at least one member selected from said group consisting of (EA) is employed as (EA) other than TiCl$_4$.

9. A process according to claim 1 wherein a reaction product obtained by reacting said (OMg) with said (ED) at 20° to 200° C. for one minute to 10 hours is employed in place of employing said (OMg) and said (ED).

10. A process according to claim 1 wherein at least one member selected from the group consisting of $(CH_3)_3Al$, $(C_2H_5)_3Al$, $(n\text{-}C_3H_7)_3Al$, $(n\text{-}C_4H_9)_3Al$, $(i\text{-}C_4H_9)_3Al$, $(n\text{-}C_6H_{13})_3Al$, $(i\text{-}C_6H_{13})_3Al$, $[CH_2CH(CH_3)(CH_2)_2CH_3]_3Al$, $(n\text{-}C_8H_{17})_3Al$, $(n\text{-}C_{10}H_{21})_3Al$, $(C_2H_5)_2AlCl$, $(n\text{-}C_3H_7)_2AlCl$, $(i\text{-}C_4H_9)_2AlCl$, $(C_2H_5)_2AlF$, $(C_2H_5)_2AlBr$, $(C_2H_5)_2AlI$, $(C_2H_5)AlCl_2$, $(i\text{-}C_4H_9)AlCl_2$, $(C_2H_5)_2AlH$, $(CH_3)_{1.5}AlCl_{1.5}$, $(C_2H_5)_{1.5}AlCl_{1.5}$, $(C_2H_5O)Al(C_2H_5)_2$ and $(C_2H_5O)_2Al(C_2H_5)$ is employed as said (OAl) to be combined with the solid product (II).

11. A process according to claim 1 wherein at least one member selected from the group consisting of ethylene, propylene, butene-1, hexene-1, heptene-1, octene-1, decene-1, 4-methyl-pentene-1, 2-methyl-pentene-1, 3-methyl-butene-1 and styrene is employed as said (α-O) to be employed for said polymerization treatment.

12. A process according to claim 1 wherein said polymerization treatment with said (α-O) is carried out in the presence of 0 to 5000 g of α-olefin polymer particles per g of the solid product (II).

13. A process according to claim 1 wherein said polymerization of propylene or propylene and at least one α-olefin is carried out by gas phase polymerization.

14. A process according to claim 12 wherein said polymerization of propylene or propylene and at least one α-olefin is carried out by slurry polymerization followed by gas phase polymerization.

15. A process according to claim 12 wherein said polymerization of propylene or propylene and at least one α-olefin is carried out by bulk polymerization followed by gas phase polymerization.

16. A process according to claim 1 wherein said polymerization treatment is carried out in the coexistence of hydrogen.

17. A process according to claim 1 wherein said polymerization of propylene or propylene and at least one α-olefin is carried out in the coexistence of hydrogen.

18. A process according to claim 1 wherein a reaction product obtained by reacting said (ED) with said (EA) at 20° to 200° C. for one minute to 10 hours is employed in place of employing said (ED) and said (EA).

* * * * *